Figure 1:
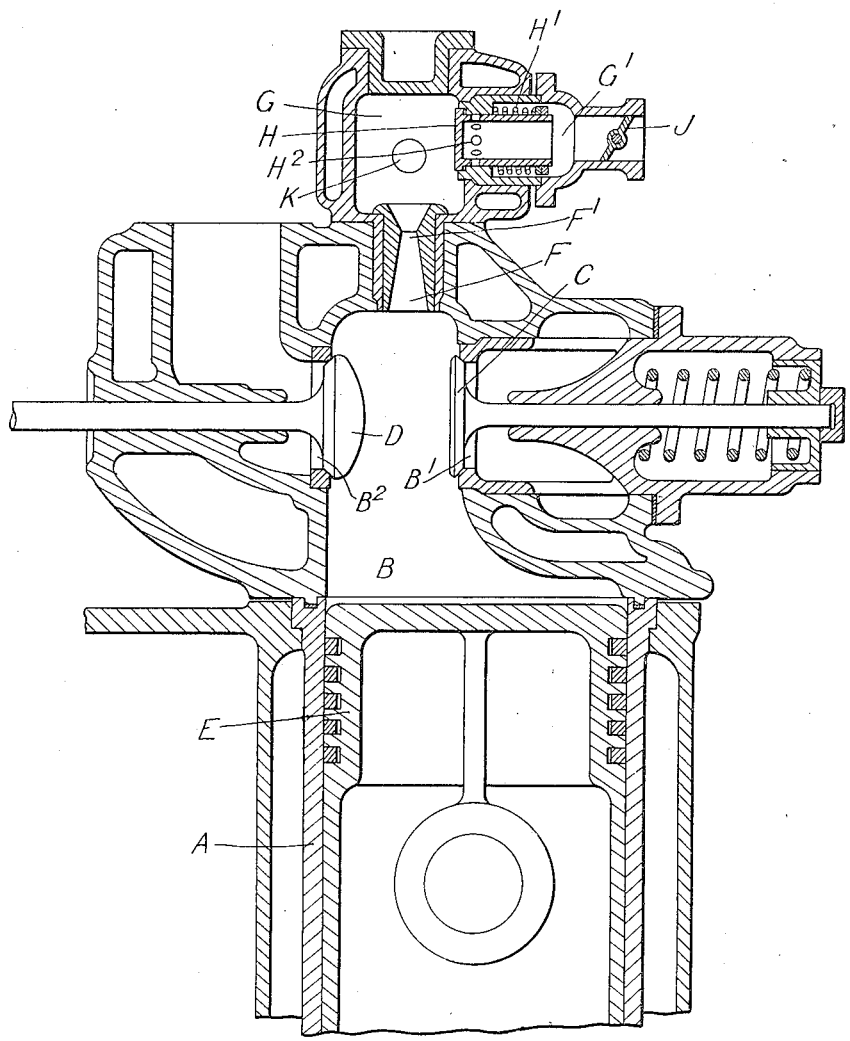

H. R. RICARDO.
INTERNAL COMBUSTION ENGINE.
APPLICATION FILED FEB. 1, 1916.

1,271,942.

Patented July 9, 1918.
2 SHEETS—SHEET 2.

UNITED STATES PATENT OFFICE.

HARRY RALPH RICARDO, OF LONDON, ENGLAND.

INTERNAL-COMBUSTION ENGINE.

1,271,942.

Specification of Letters Patent.  Patented July 9, 1918.

Application filed February 1, 1916. Serial No. 75,578.

*To all whom it may concern:*

Be it known that I, HARRY RALPH RICARDO, subject of the King of England, residing at London, in England, have invented certain new and useful Improvements in Internal-Combustion Engines, of which the following is a specification.

This invention relates to internal combustion engines and has for its object to increase the thermal efficiency of engines working on the constant volume or explosion cycle and using either gas or light vaporized oils such as petrol or paraffin.

According to the generally accepted air standard of efficiency, the efficiency of any normal type of internal combustion engine is dependent upon the compression ratio alone. This theory holds good only so long as the working fluid is pure dry air of constant specific heat. With the actual working fluid used, however, the specific heat increases with increase of temperature, and the effect of this increase is to reduce the efficiency. Since the change of specific heat is dependent upon the temperature it is clear that the ideal thermal efficiency of any internal combustion engine falls as the maximum temperature is increased: at the same time the loss of heat to the cylinder walls is also dependent upon the temperature, so that from every point of view it is desirable to keep the temperature as low as possible. The maximum temperature is clearly dependent upon the density of the mixture in the cylinder which includes gas, air and residual exhaust gases. So long as the mean mixture density in the cylinder remains the same so will the maximum temperature remain constant irrespective of the quantity. If, however, the mean mixture density of the gases within the cylinder be reduced then the temperature also will be reduced but, in this case, a limit is soon reached at which the density of the mixture becomes too weak to ignite, or at all events to burn completely. Consequently engines cannot be controlled over any wide range of load by merely altering the mixture density, and it becomes necessary to resort to quantity governing, that is to say, governing by varying the quantity of combustible mixture admitted to the cylinder, but not its heat value, so that the maximum temperatures remain approximately the same at all loads. If it were possible to isolate a small quantity of combustible mixture, having the correct proportion to give the most rapid and complete combustion, in one portion of the cylinder, at the same time admitting a full charge of air to the remainder of the cylinder, and if at the end of the compression stroke the small isolated portion were ignited and simultaneously mixed with the air in the cylinder, complete combustion could be obtained with a mixture of extremely low mean density, and consequently with a very low maximum temperature. Thus the losses due both to the increasing specific heat of the gases and also the loss of heat to the cylinder walls would be reduced, and the efficiency of the engine would increase as the load was reduced for in this case the mean pressures and temperatures would bear an almost constant relation to one another. Some such result as this could be obtained by means of stratification, but stratification involves a certain amount of stagnation of the gases, and this is not consistent with rapid or complete combustion. The ideal condition which must be aimed at is that the isolated portion of combustible mixture shall be in a state of violent turbulence during the compression stroke while the air in the cylinder shall be more or less stagnant. This condition can be produced by the present invention.

According to this invention the cylinder is provided with a pocket or compartment which is water-jacketed or otherwise efficiently cooled and communicates with the combustion space through a short narrow passage, the pocket containing some form of ignition device and an automatic or suction operated valve. The cylinder is further provided with the usual valve-controlled exhaust opening and with an inlet opening of large area controlled by a positively operated valve. The method of operation is as follows:—First during the suction stroke a combustible mixture which in quantity or strength is proportional to the load is supplied to the cooled pocket through the valve-controlled opening therein, next the cylinder is filled with air only which is drawn in through the inlet opening, the fuel inlet being closed practically simultaneously with the opening of the air valve and finally after completion of the compression stroke the charge in the pocket is fired by means of the ignition device situated therein. With this construction and method of operation the charge which fills the cylinder at each suction stroke is divided into a relatively small quantity of rich and readily ignitible mixture which is contained in a part of the cylinder so constructed or partitioned off as to form a pocket, and a relatively large quantity of pure air or mixture which is too weak to readily ignite. When the small charge of combustible mixture is ignited it causes so great a disturbance that combustion takes place with extreme rapidity. Further the high temperature gases from the pocket will not impinge directly on the piston but only through the interposed body of relatively cool air.

The pocket is so situated that the combustible mixture therein is kept as far as possible from the piston and other highly heated parts and in consequence of this and the fact of the pocket being cooled so as to maintain it at as low a temperature as possible it is possible to use a high compression without risk of premature ignition. Further owing to the manner in which the total charge is divided up, the large quantity of air in the cylinder and the rapidity with which combustion takes place it is possible to maintain a high mean effective pressure in the cylinder without obtaining unduly high temperatures. While maintaining substantially constant the amount of air drawn into the cylinder the mean effective pressure can be varied in accordance with the load by varying the quantity or richness of the combustible portion of the total charge. Thus the engine is controlled by regulating the amount of mixture admitted to the pocket or the richness of this mixture. In this way it is possible to run an engine with a light load on so low a proportion of fuel to the total amount of air in the charge that if the fuel and air in these proportions were intimately mingled combustion would not take place or the charge could not readily be fired.

The fuel and air inlet valves are so constructed and operated that the opening of the air valve, which is positively operated, results in such a reduction of the suction effect on the fuel valve that the latter closes forthwith and shuts off the supply of combustible mixture to the pocket. The air valve is opened after the piston has performed about 15% to 20% of its suction stroke.

The following is an example of the manner in which the present invention may be put into practice: A pocket or bulb conveniently of pear or similar shape is mounted on the head of the cylinder the passage through which communication is established between the pocket and the combustion space being short and contracted to a relatively small cross-sectional area. The wall of the pocket is made as thin as possible consistent with the necessary strength and it is water-jacketed in such a way as to maintain its temperature as low as possible. In the pocket is an opening conveniently of small dimensions controlled by an inlet valve preferably spring-controlled so that it will yield on the suction stroke. The capacity of the pocket is dependent upon the particular fuel to be employed in the engine, thus for instance if petrol or similar fuel is to be used having a high heating value a small pocket could be employed while on the other hand if the fuel is producer, blast furnace gas or other gas of like nature the pocket must have a considerable capacity. The openings for the inlet of air and for the exhaust, which openings are controlled by valves both positively operated in some suitable manner, may be oppositely disposed in a combustion space in or on the head of the cylinder, this combustion space being so formed and situated that the passage from the pocket leads into it at one end while at the other end this chamber is directed toward the piston the inlet and exhaust openings being intermediately placed.

The operation is as follows:—Assuming at the commencement that the piston is on the inner dead center, as the piston moves outward during the first part of the suction stroke the air inlet valve is maintained closed and consequently combustible mixture is drawn into the pocket and displaces the residual exhaust products which may be therein. At a suitable point in the suction stroke, which as mentioned is preferably from 15% to 20% of this stroke, the air inlet valve is opened and air freely passes into the cylinder during the remainder of the outward suction stroke. Since the valve in the pocket is spring-controlled it follows that it will close immediately the vacuum in the main cylinder is relieved by the opening of the air inlet valve. Consequently the further supply of fuel to the pocket is cut off when the air valve opens. The opening of this main inlet valve is so timed that when a full charge of combustible mixture is being drawn into the pocket the amount of this charge will be such as not to greatly exceed the capacity of the pocket when this charge is fully compressed. When owing to the opening of the air inlet valve the partial vacuum which during the first portion of the stroke has been formed in the pocket is relieved there will be a tendency for gas to flow back into the pocket, hence combustible mixture which may have passed through the passage communicating with the combustion chamber will be drawn or caused to flow back toward or into the pocket and thus away from the piston. In this way the combustible mixture is mainly or entirely confined to the pocket and at the end of the suction stroke the cylinder is filled with pure air or air having so small an admixture of fuel that it is not liable to ignition. The air inlet valve closes at or soon after the piston has completed its suction stroke. As the piston returns on the compression stroke any of the rich combustible mixture which may occupy the combustion chamber adjacent to the passage leading into the pocket is driven back into or toward the pocket and thus is prevented from coming in contact with any of the high heated parts of the engine while compression is taking place and when the temperature is rising rapidly. Toward the end of the compression stroke practically the whole of the rich combustible mixture is confined to the cool pocket. At the end of the compression stroke the mixture in the pocket is ignited by a sparking plug or other convenient device disposed therein. Rapid and effectual combustion now takes place and as the heated products rush into the cylinder they mingle with the higly compressed air therein and rapidly raise its temperature causing a rapid increase in pressure. The high temperature gases as they issue from the pocket cannot however impinge directly on the piston owing to the air contained in the main combustion space through which they have to pass. The gases now expand during the outstroke being subsequently exhausted in the usual manner.

Control of the power and speed may be effected either by varying the quantity of fuel admitted to the pocket or by varying the density of the mixture so admitted, the conditions however at the end of the compression stroke being the same in either case. It is not necessary to interfere with the free flow of air through the main inlet valve under any conditions of load or speed. The quantity of air which enters the cylinder at each suction stroke is practically constant as it is substantially unaffected by such variations as may take place in the quantity of fuel admitted to the pocket.

Under certain circumstances as for example when running on full load with a rich mixture in the pocket, this mixture may be too rich for complete combustion in the pocket but owing to the rapid rise of pressure within the pocket when ignition takes place the contents are driven out into the combustion chamber at a high velocity where they immediately combine with the excess of air in the cylinder and complete combustion takes place. The issuance of the gases at high velocity from the narrow passage leading from the pocket into the combustion chamber causes the violent turbulence which is necesary for rapid combustion.

It is to be noted that it is of importance that the pocket be maintained at as low a temperature as possible by efficient cooling so as to permit of the use of a high compression without fear of premature ignition. Also the manner in which the combustible mixture is admitted to the pocket and cylinder is such that any tendency of the mixture to flow toward the piston during the latter part of the suction stroke or during the earlier part of the compression stroke is counteracted so that the mixture tends to remain as far as possible from any highly heated parts. It is desirable to construct as far as practicable the passage between the pocket and the combustion space so as to avoid or minimize diffusion between the rich mixture in the pocket and the air in the cylinder, and at the same time produce violent turbulence in the pocket by the inrush of air which takes place during the compression stroke. The length of this constricted passage however should be short owing to the considerable heat developed therein and the consequent necessity for efficient cooling of it which gives rise to practical difficulties if the length of the passage is increased unnecessarily. It will be appreciated that the general effect of the improved construction and operation is to keep down the temperature in the cylinder while maintaining a high compression ratio.

In the accompanying drawings which illustrate by way of example how the present invention may be put into practice, Figure 1 is a longitudinal sectional elevation of the head of the cylinder of an internal combustion engine constructed in accordance with this invention.

Figure 2:
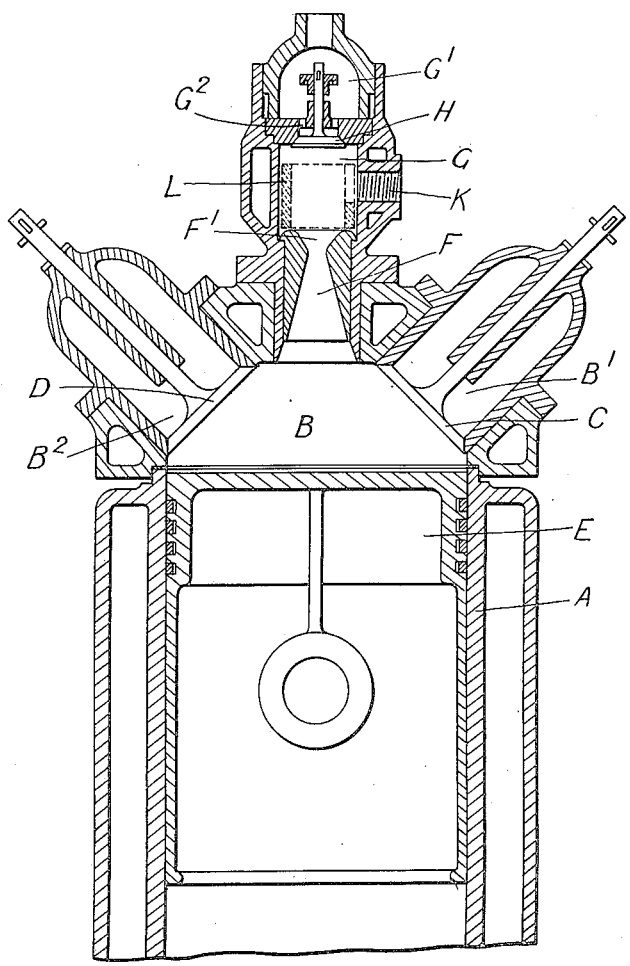

Fig. 2 is a similar view showing a modified arrangement of the pocket and valves.

Like letters indicate like parts throughout the drawings.

Referring to Fig. 1, the cylinder A is provided with an extension constituting a combustion space B which is water-jacketed and provided with inlet and exhaust openings. The air inlet opening B' is closed by a valve C which is spring-loaded but provided with some suitable means for effecting positive opening. The exhaust opening B² is closed by a valve D which is also spring-loaded and positively opened in some convenient manner. At the end of the combustion chamber B remote from the cylinder proper A and conveniently facing the piston E is a short passage F preferably formed with a constriction F' so that the passage resembles a Venturi tube. This passage leads into a pocket or compartment G which is water-jacketed and provided with an inlet opening closed by a valve H controlled by a spring H'. In the passage G' leading to this opening is a throttle valve J of some suitable type. The spring H' is preferably a light one so that the valve H will lift as a result of slight reduction of the pressure in the pocket G. The valve H is conveniently formed as a cylinder with closed end the cylinder having ports H² formed in its wall. When there is a reduction of pressure in the pocket G due to suction the cylinder can slide in the inlet passage and fuel then enters the pocket as the ports H² are uncovered. It is to be noted that fuel only or a rich mixture of fuel and air is always admitted into the pocket G past the valve H the quantity of the fuel or combustible mixture thus admitted being varied by means of the throttle J in accordance with the load on the engine. On the other hand air only and in practically constant quantity enters the combustion space B through the opening B' past the valve C.

The engine thus constructed operates in the following manner:—

At the beginning of the suction stroke the main air inlet valve C is not opened but a charge of either pure gas or very dense mixture is drawn into the pocket G past the valve H. After the piston E has traversed from 15% to 20% of its stroke the valve C is lifted and air enters the combustion space B and the cylinder A during the remainder of the outstroke of the piston at a comparatively low velocity. Simultaneously with the opening of the air valve C the fuel valve H closes. Owing to the partial vacuum which existed in the pocket G in consequence of the spring loading of the valve H, there is a tendency for any combustible mixture which may have overflowed from the pocket G through the passage F F' into the combustion space B to be driven back into the pocket G during that portion of the suction stroke when the air inlet valve C is opened, since there is such a free inflow of air through the opening B'. During the compression stroke of the piston the air in the cylinder A and combustion space B which is more or less stagnant owing to the low velocity with which it entered, is compressed and a portion of it is forced through the passage F into the pocket G creating therein violent turbulence which is assisted by the constriction F' past which the air has to flow. At the end of the compression stroke the combustible mixture in the pocket G is ignited by means of a sparking plug conveniently situated at K and the resultant sudden expansion of the burning gases in the pocket forces these gases out through the constricted passage F F' at an exceedingly high velocity thus creating violent turbulence within the combustion space B.

The power of the engine is controlled by varying the quantity of pure gas or combustible mixture admitted past the valve H to the pocket G, the cylinder A and combustion space B being practically at all times filled with pure or substantially pure air. On light loads at the time of ignition the pocket G alone contains combustible mixture, the main combustion space B containing pure air and a small proportion of products of combustion. On heavier loads however, the quantity of gas or combustible mixture admitted to the pocket G may be so large that some of it overflows into the main combustion space B or into the cylinder. In this case the conditions at the time of ignition are that the pocket G contains a rich charge of combustible mixture while the remainder of the combustion space contains a mixture which may be too weak to ignite under normal circumstances. Owing however to the high temperature of the flame issuing through the passage F F' and the violent turbulence created by it in the combustion space B that portion of the charge which is in this space is thoroughly and rapidly ignited throughout its whole bulk.

In the modified construction shown in Fig. 2 the fuel inlet passage G' leads through a series of ports G² controlled by a puppet valve of ordinary type into the pocket G the valve and ports being conveniently in axial alinement with the passage F F' leading from the pocket into the combustion chamber B. The latter is formed so that the passage F F' is practically situated on the axis of the cylinder and the inlet and exhaust openings B' and B² are directed at an angle toward the piston E with the valves C and D correspondingly arranged. This gives a more desirable form for the combustion chamber B and enables the gases and air to flow more directly into and out of the cylinder A.

When the engine is to be run on heavier oil such as paraffin it is convenient to provide some means for assisting vaporization of the fuel in the pocket G. This may take the form of a metallic sleeve or other like member such as L disposed in the pocket as shown in dotted lines in Fig. 2.

This sleeve fits loosely in the pocket or is otherwise arranged so as not to make contact with the walls of the pocket or only to the least possible extent. Thus the sleeve L becomes highly heated and remains substantially in that state without appreciably affecting the cooling of the walls of the pocket or in its turn being cooled to any extent thereby. As the fuel enters the pocket it impinges on the heated body L which assists in its vaporization. The sleeve L is conveniently cut away or otherwise arranged so as not to obstruct the sparking plug inserted at K.

The timing of the air inlet valve C and the proportions both of the pocket G and the passage F together with the constriction F' are to some extent dependent upon the heating value of the fuel used.

The shape and disposition of the pocket and valves and the methods of operating them together with the details of construction may be varied to suit requirements. When applying the invention to an engine operating on the two-stroke cycle means may be provided for pumping or forcing the fuel or mixture into the pocket while the entrance of the air into the cylinder may be assisted by means of a blower or this air may be compressed in some suitable manner before admission.

What I claim as my invention and desire to secure by Letters Patent is:—

1. In an internal combustion engine, the combination of a cylinder provided at its head with a pocket that communicates with the combustion chamber of the cylinder through a constricted passage, a piston within the cylinder, an ignition device within the pocket, and means whereby during each suction stroke of the piston the pocket and combustion chamber are successively filled with fuel and air respectively, for the purpose described.

2. In an internal combustion engine the combination of a cylinder, a cylinder cover, a pocket mounted on the cylinder cover, a short passage in which is a constriction, the passage constituting a means of communication between the pocket and the interior of the cylinder, means for cooling the pocket, an ignition device disposed in the pocket, a spring controlled valve controlling an opening through which fuel is admitted into the pocket, a valve controlling an opening in the cylinder cover through which air is admitted to the cylinder, means for operating this valve, a valve controlling an opening in the cylinder cover for the passage of the exhaust products, and means for operating this valve as set forth.

3. In an internal combustion engine, the combination of a cylinder having a pocket communicating with the combustion chamber therein through a relatively narrow passage, a piston within the cylinder, means for admitting fuel to the pocket, means for admitting air to the combustion chamber of the cylinder, means for withdrawing exhaust gases directly from the combustion chamber, and an ignition device within the pocket, the several parts being so related that at each suction stroke of the piston a rich charge of fuel is first drawn into the pocket after which the fuel inlet is closed and air inlet opened so that on the completion of said outward stroke of the piston the combustion chamber is filled with air for the purpose described.

4. In an internal combustion engine, the combination of a cylinder having a pocket communicating with its combustion space, a piston in the cylinder, means for supplying fuel to the pocket, means for cooling the pocket sufficiently to prevent ignition of its contents by the heat of any part thereof, means for admitting air to the combustion space of the cylinder, valves respectively controlling the admission of fuel to the pocket and air to the cylinder, a valve controlled exhaust outlet opening directly into the combustion space in the cylinder, and an ignition device within the pocket, the several parts being so related that during each cycle of operation a rich charge of fuel is drawn into said pocket and a larger charge of air drawn into the cylinder by the suction stroke of the piston, the complete charge compressed by the instroke of the piston and the compressed fuel charge ignited in the pocket, substantially as described.

5. In an internal combustion engine the combination of a cylinder, a cylinder cover, a pocket mounted on the cylinder cover, a short passage constituting a means of communication between the pocket and the interior of the cylinder, a constriction at some point in the length of this passage, means for cooling the pocket, an ignition device disposed in the pocket, a passage for the delivery of fuel terminating in an inlet opening in the pocket, a spring-loaded valve controlling this inlet, a throttle valve in the fuel passage, a valve controlling an opening in the cylinder cover through which air is admitted to the cylinder, means for intermittently lifting this valve to a constant extent, a valve controlling an opening in the cylinder cover for the passage of the exhaust products and means for operating this valve as set forth.

6. In an internal combustion engine the combination of a cylinder, a cylinder cover, a pocket mounted on the cylinder cover, a short passage constituting a means of communication between the pocket and the interior of the cylinder, a constriction at some point in the length of this passage, means for cooling the pocket, an ignition device disposed in the pocket, a passage for the delivery of fuel terminating in an inlet opening in the pocket, a spring-loaded valve controlling this inlet, a throttle valve in the fuel passage, a body fitting loosely within the pocket and so formed and disposed that fuel entering the pocket past the valve will impinge thereon, a valve controlling an opening in the cylinder cover through which air is admitted to the cylinder, means for intermittently lifting this valve to a constant extent, a valve controlling an opening in the cylinder cover for the passage of the exhaust products and means for operating this valve as set forth.

7. The herein described method of operating an internal combustion engine in which each cycle comprises successively drawing into an engine cylinder a rich charge of fuel and a relatively larger charge of air only, during the suction stroke of the piston, said fuel and air charges being maintained substantially separate one from the other and the charge of air being interposed between the piston and fuel charge, compressing the complete charge by the instroke of the piston, and igniting the compressed fuel charge.

8. The herein described method of operating an internal combustion engine in which each cycle comprises drawing a rich charge of fuel into an ignition chamber, that communicates with the combustion space of an engine cylinder, by the first portion of the suction stroke of the piston, then closing the fuel inlet and opening a valve, which permits air only to be drawn directly into the cylinder during the remainder of the suction stroke, compressing the complete charge by the instroke of the piston, and firing it by a suitable device located in the ignition chamber.

In testimony whereof I have signed my name to this specification in the presence of two subscribing witnesses.

HARRY RALPH RICARDO.

Witnesses:
   EUSTACE H. BARKER,
   C. GROVES.